(12) United States Patent
Meagher

(10) Patent No.: US 6,907,780 B1
(45) Date of Patent: Jun. 21, 2005

(54) FUEL LEVEL SENSOR

(75) Inventor: John T. Meagher, Hawthorn Woods, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/725,019

(22) Filed: Dec. 1, 2003

(51) Int. Cl.[7] .................. G01F 23/00; G01F 23/14; G01F 23/185
(52) U.S. Cl. .................. 73/299; 73/292; 73/301
(58) Field of Search .................. 73/1.73, 290 B, 73/290 R, 291, 292, 925, 296, 298, 299, 300, 302, 303

(56) References Cited

U.S. PATENT DOCUMENTS

| | | | | |
|---|---|---|---|---|
| 1,508,969 A | * | 9/1924 | Guichard | 73/290 R |
| 4,930,811 A | * | 6/1990 | Tsukada et al. | 280/834 |
| 5,105,662 A | * | 4/1992 | Marsh et al. | 73/299 |
| 6,282,953 B1 | | 9/2001 | Benjey | 73/438 |
| 6,598,473 B2 | * | 7/2003 | Atkinson | 73/290 V |
| 6,672,138 B2 | * | 1/2004 | Cook et al. | 73/40.5 R |
| 6,857,313 B2 | * | 2/2005 | Williamson | 73/304 C |

* cited by examiner

Primary Examiner—Hezron Williams
Assistant Examiner—David A. Rogers
(74) Attorney, Agent, or Firm—Brian M. Mancini

(57) ABSTRACT

According to an exemplary embodiment, the present technique relates to a fuel sensor for determining operational fuel level ($h_{new}$) in a fuel tank (14). In the exemplary embodiment, an isolated airspace (44) is created. By monitoring the pressure conditions in the isolated airspace 44 as well as the pressure and temperature conditions in the remainder (42) of the tank (14), the operational fuel level ($h_{new}$) may be determined.

29 Claims, 3 Drawing Sheets

FUEL LEVEL SENSOR

FIELD OF THE INVENTION

The present technique relates to methods and apparatus for determining fuel quantities in fuel tanks. More particularly, the present technique relates to determining fuel quantities by monitoring pressure and temperature conditions of the fuel tank.

BACKGROUND INFORMATION

This section is intended to introduce the reader to various aspects of the art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Internal combustion engines are usually powered by a liquid fuel, which is stored in a tank discrete from the engine. Fuel tanks are generally sized to provide for sustained operation of the engine. For example, automobiles traditionally include fuel tanks of sufficient size to power the automobile for hundreds of miles. Accordingly, many engine or motor driven systems are equipped with fuel-monitoring systems that monitor and/or display the quantity of fuel remaining in the tank to inform the operator of the need to replenish the fuel supply before it is exhausted.

Typically, fuel-monitoring systems include a sending unit that is physically located in the fuel tank and a display unit that is located external to and, sometimes, distant from the fuel tank. The sending unit determines a level of fuel in the tank and sends an electrical signal representative of that level to the display unit, such as a gauge. In turn, the gauge visually indicates the amount of fuel remaining in the tank. For example, automobiles typically include a fuel gauge having a needle that moves between incremented "Full" and "Empty" positions on the gauge, thereby indicating the relative amount of fuel in the tank.

Traditional sending units include a float, usually made of foam, coupled to a variable resistor by a thin metal rod, generally known as a wiper. Because the float is more buoyant than the fuel, the float remains at the surface of the fuel in the tank. Accordingly, the level of fuel in the tank defines the position of the float and, in turn, the position of the wiper. The movement of the wiper along the variable resistor alters the electrical current sent to the display gauge, thereby indicating the relative level of fuel in the tank.

Unfortunately, the harsh petrochemical environment of the fuel tank may lead to malfunctions in the mechanical float and wiper assembly. Moreover, the mechanical nature of the float mechanism may also lead to inaccuracies in measuring the level of fuel in the tank. For example, the connection between the wiper and the variable resistor and/or or the top of the tank itself may limit the range of motion of the float. Accordingly, the float may be partially submerged in the fuel, so it will not begin to sink until the level of fuel in the tank reaches the bottom of the float. Thus, the sending unit will indicate a maximum or full level in the tank although a measurable amount of fuel has been consumed. In a similar manner, inaccuracies may develop when the fuel level approaches the bottom of the tank. Often, the float's range of motion does not extend to the very bottom of the tank. Accordingly, the sending unit may indicate an empty condition in the tank even though an appreciable amount of fuel remains in the tank. Moreover, the float mechanism may be affected by the orientation of the vehicle, for example if the vehicle is on a hill.

Furthermore, automobile design and construction have become increasingly complex. To increase interior space, for example, automobile designers are placing more automobile components into smaller spaces. Accordingly, to achieve maximum use of the available space and to maximize fuel tank size, fuel tanks may often be shaped to present unconventional contours. Indeed, fuel tanks may be shaped to fit around pieces of the body, frame, and/or other automobile components. Traditional sending units (i.e., those with float assemblies) may be unable to compensate for such contoured designs.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

According to one embodiment of the present technique, our exemplary fuel sensor system is described herein. The fuel sensor system determines pressures in two regions of the tank that are isolated from each other by the fuel in the tank. Additionally, the fuel sensing system determines tank temperature. By using the Ideal Gas Law, along with manometric principals, the fuel sensor system determines the level of fuel at a given point in the tank via the sensed parameters. This level of fuel in the tank may then be employed to determine the quantity of fuel remaining in the tank. Advantageously, the exemplary fuel sensor system reacts to minor changes in the level of fuel, thereby providing a more accurate determination of the quantity of fuel remaining in the tank. Moreover, the exemplary system does not use a mechanical float assembly, thereby increasing the reliability and reducing the cost of the system.

Figure 1:
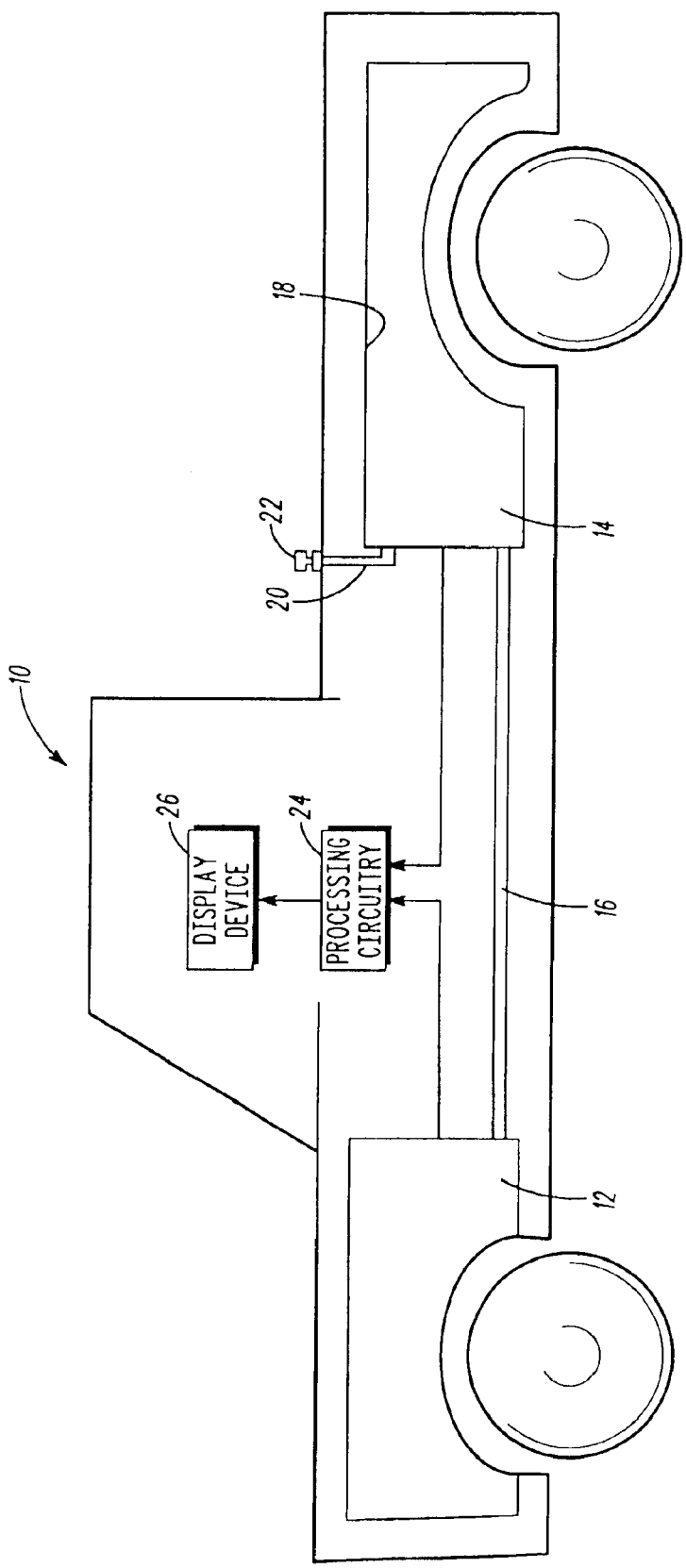
FIG. 1 represents an exemplary vehicle having a fuel tank that incorporates aspects of the present technique.

Referring initially to FIG. 1, an exemplary vehicle 10, which for the purposes of explanation is an automobile, is illustrated. Although the technique is presently discussed in relation to an automobile, it is worth note that the present technique may be applied to any number of different modalities. For example, the present technique may be applied to other types of vehicles, such as heavy equipment, marine craft, or airplanes, as well as to non-vehicles, such as generator sets. Indeed, the present technique may be applied to any number of applications in which the level of a stored liquid is a concern. For example, the present technique may be applied to petrochemical storage tanks, tanks employed in the food industry, and so forth.

Returning to the exemplary automobile, it comprises an internal combustion engine 12, such as a diesel or gasoline engine, that works in conjunction with other components to provide a motive force to the automobile 10. The engine 12 is powered by fuel (see FIG. 2), such as gasoline, diesel, alcohol, ethanol, kerosene, or any other suitable combustible liquid, stored in a fuel tank 14. A fuel line 16 routes fuel from the tank 14 to the engine 12.

The fuel tank 14 may be formed of a corrosion resistant material, such as plastic, metal, or any other material suitable for storing fuel. For example, the fuel tank 14 may comprise an outer shell 18 formed of a blow-molded plastic. Advantageously, blow-molded plastics may be contoured into complex shapes, thereby facilitating the construction of tanks that are contoured to the shape and variable spaces of the vehicle 10. Accordingly, component space within the vehicle 10 may be more efficiently allocated. Moreover, blow-molded plastics provide a rigid structure that is relatively lightweight compared to traditional materials, such as steel.

To replace fuel consumed during operation of the vehicle, the fuel tank 14 may include a fuel fill 20 located towards an upper portion (with respect to the orientation of the present figures) of the tank 14 and fluidically coupled to the interior of the tank 14. In many jurisdictions, the law may restrict the amount of vaporized fuel allowed to escape from the tank 14. Accordingly, the fuel fill 20 may include a check valve or other suitable apparatus (not shown) that permits the ingress of fresh fuel while concurrently preventing the egress of vaporized fuel. The fuel fill 20 may also include a cap 22 that is releasably secured to the fuel fill 20 by a screw and thread arrangement, fasteners, latches, or any other suitable fastening mechanism. The cap 22 may buttress the check value in the fuel fill 20 to further prevent the inadvertent release of vaporized fuel into the atmosphere.

During operation, it may be advantageous to observe, manipulate, monitor, and/or display any number of vehicle conditions and parameters. Accordingly, the vehicle 10 may include processing circuitry 24. Those of ordinary skill in the art appreciate processing circuitry and the components and operations thereof. The processing circuitry 24 may receive data from any number of systems within the vehicle 10, such as the engine 12 and, as further discussed below, the fuel tank 14. Moreover, the processing circuitry 24 may store data provided by the manufacturer, service provider, and/or user of the vehicle and may also store data received from the various vehicle systems. The processing circuitry 24 may employ the data received and/or stored to calculate certain output values, for example, the quantity of fuel in the tank. Indeed, to carry out such computations or calculations, the processing circuitry 24 may include any number of computing components, such as a processor, RAM memory, ROM memory, and/or any other suitable computing components. Moreover, the processing circuitry 24 may be configured to operate software programs that receive data from various locations and produce appropriate output values in response to the data. The processing circuitry 24, in turn, may transmit the received data or calculated output values, again for example, to a display device 26, such as a fuel gauge, a warning light, and so forth, located in the passenger compartment of the vehicle.

Figure 2:
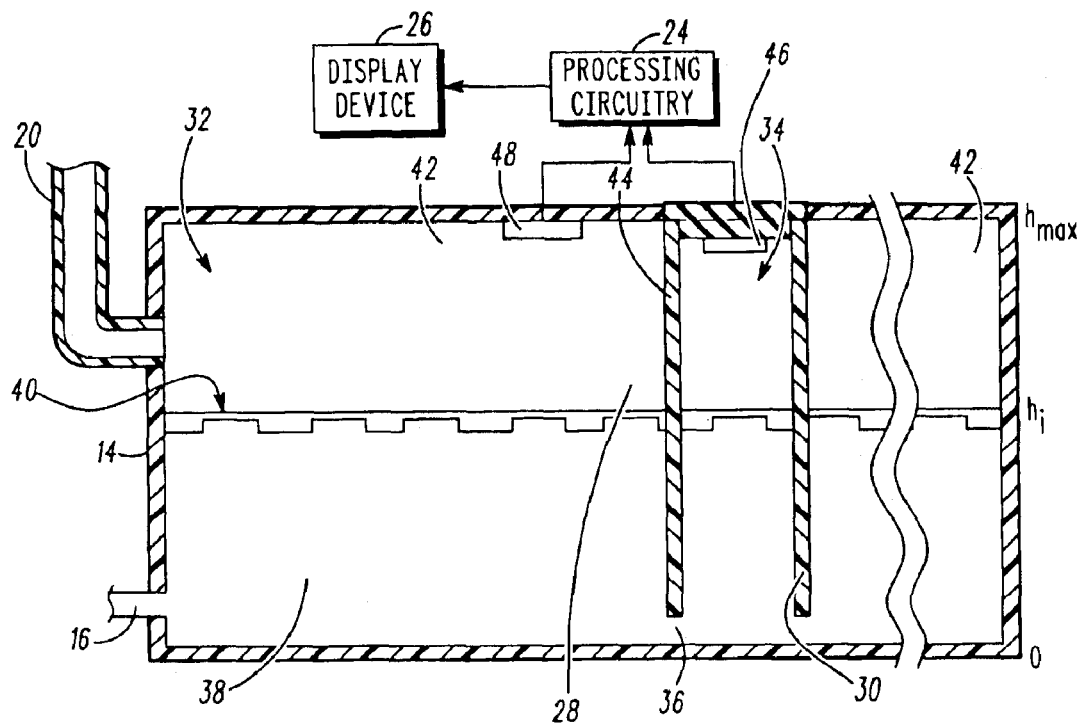
FIG. 2 is a partial cross sectional view of the fuel tank introduced in FIG. 1 illustrating the fuel tank in an initial fill condition.

Turning next to FIG. 2, this figure affords a view the interior region 28 of the exemplary tank 14. The exemplary tank 14 presents a generally rectangular cross section having a maximum tank height $h_{max}$. Although the exemplary tank 14 is simple in design, the following discussion demonstrates that the present technique may be applied to tanks having any number of complex shapes and contours. A partitioning tube 30 divides the interior region 28 into two discrete areas, a primary region 32 and a secondary region 34. In the illustrated embodiment, the partitioning tube 30 extends from the top wall of the tank 14 to a point just slightly above the bottom wall of the tank 14, thereby forming a gap 36 in the bottom of the tank 14 that fluidically couples the two regions 32 and 34. That is, the gap 36 facilities flow of liquid fuel 38, such as diesel fuel, gasoline, kerosene, or any other suitable combustible liquid, between the two regions 32 and 34.

During an initial state, it may be the case that there is no fuel 38 disposed in the tank 14. In such a state, air is free to flow between the two regions 32 and 34 via the gap 36. However, as fuel 38 is added to the tank 14 (via the fuel fill 20), the fuel level 40 begins to rise. Once a certain amount of fuel 38 is added to the tank 14, the fuel level 40 will surpass the height of the gap 36 and, as such, submerge the gap 36. Because air is less dense than liquid fuel, as appreciated by those of ordinary skill in the pertinent art, air disposed above the fuel 38 is isolated from the gap 36. Accordingly, the interior region 28 of tank 14 is divided into two isolated airspaces: a primary airspace 42, defined by the walls of the tank 14, the fuel 38, and the exterior surface of the partitioning tube 30; and a secondary airspace 44 defined by the interior surface of the partitioning tube 30, the fuel 38, and the top wall of the tank 14.

In the illustrated embodiment, each of the airspaces 42 and 44 may include sensor assemblies, such as an EVAPorative sensor assembly 46 (EVAP) configured to measure vapor pressure, and a temperature-EVAPorative pressure sensor assembly 48 (TEVAP) configured to measure both temperature and pressure. As discussed further below, the sensor assemblies 46 and 48 may be configured to transmit signals representative of the sensed conditions to the processing circuitry 24. Those of ordinary skill in the art appreciate such sensor assemblies and the operations and workings thereof. Advantageously, to limit exposure of the sensors 46 and 48 to corrosive fuels, the sensor assemblies 46 and 48 may be located towards the top of the tank 14. Additionally, the sensor assembly 46 disposed in the secondary airspace 44 may be a removable assembly. In other words, the entire sensor assembly 46 may be removable from an aperture in the top wall of the tank 14. To prevent the ingress and egress of gases between the removable sensor assembly 46 and the fuel tank 14, the sensor assembly 46 may include an O-ring seal that may swell in the presence of fuel vapors, thereby sealing the assembly 46 with respect to the tank 14. Those of ordinary skill in the pertinent arts appreciate such O-ring seals. Moreover, those of ordinary skill in the art appreciate that any number of sealing means, such as epoxy, coatings, rubber seals, mechanical seals, split seals, or any other suitable sealing mechanism may be employed.

As stated above, during an initial state, the fuel tank 14 may have no fuel 38 disposed therein. Accordingly, air within the tank may flow freely between the two regions 32 and 34 of the tank 14. Moreover, atmospheric air may enter into the secondary region 34 via the loose fit between the tank 14 and the sensor assembly 46 (i.e., the unswelled O-ring between the sensor assembly 46 and the tank 14). However, as fuel 38 is added to the tank 14 to achieve an initial fuel level $h_i$, for example, the gap 36 is submerged, and fuel vapors swell the O-ring, which seals the sensor assembly 46 with respect to the tank 14. Accordingly, air in the secondary airspace 44 is trapped. Indeed, so long as the seal integrity of the sensor assembly 46 is maintained and the fuel level 40 remains above the gap 36, the air trapped in the secondary airspace 44 will be the air that was trapped during the initial fill. Because the tank was not a sealed environment during the initial fill, the initial fuel level $h_i$ may be uniform across the length of the tank. That is, the fuel 38 will flow between the two regions 32 and 34 and reach an equilibrium state, thereby presenting a uniform initial fuel height $h_i$ across both regions 32 and 34. Moreover, the initial vapor pressure of the air in the primary and secondary airspaces 42 and 44 may also be equal, that is in an equilibrium state.

During operation, for example during refueling, a fresh infusion of air may enter the primary air space 42. By contrast, the secondary airspace 44 may be isolated from any external air source. Accordingly, so long as the gap 36 remains submerged (i.e., the fuel level 40 is above the height of the gap 36), the air in the second region will be static. That is, no new air will be added and no originally trapped air will be released. As discussed further below, because the air in the secondary air space 44 is trapped, by monitoring the changes in pressure in the primary and secondary airspaces, in conjunction with the temperature of the tank, the processing circuitry 24 may determine the fuel level 40 in the tank 14 at various points in time. That is, by monitoring the variation in pressure between the two regions and the temperature of the interior region 28 as a whole, the change in fuel level caused by fuel consumption may be determined. For one example, between operating and quiescent conditions, temperature in the tank may vary between −40° C. to 105° C. and pressure in the tank may vary between 0 to 20 psi.

Figure 3:
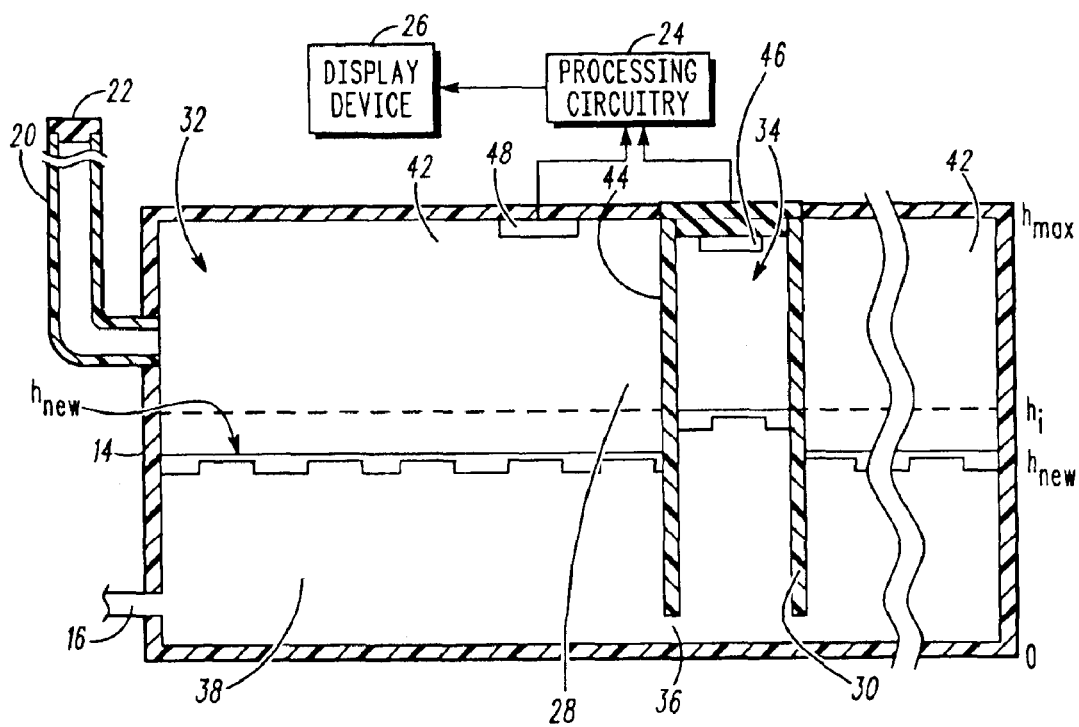
FIG. 3 is a partial cross sectional view of the tank introduced in FIG. 1 illustrating the fuel tank in an operational condition.

As fuel 38 is consumed, the fuel level 40 begins to drop, as illustrated in FIG. 3. For example, the fuel level 40 in the primary region 32 may fall to an operation fuel level $h_{new}$. Additionally, the fuel level in the secondary airspace 44 may change as well. However, if the vapor pressure in the primary airspace is greater than the vapor pressure in the secondary airspace 44, the fuel level in the secondary airspace 44 may drop less. In any event, the volume of the secondary airspace 44 will respond to the fuel consumption as well. Accordingly, as the fuel level 40 decreases, the volumes of primary and secondary airspaces 42 and 44 are altered.

As stated above, the secondary airspace 44 is sealed, and, as such, the amount of air within the secondary airspace 44 remains constant. By fixing the amount of air within secondary airspace 44, the trapped air will behave in accordance with the Ideal Gas Law. The Ideal Gas Law states that the changes in the temperature (T), volume (V), or pressure (P) of an ideal gas are proportionally related, and as such, the affect of a changed parameter is predictable. Formulaically, the Ideal Gas Law may be represented as, $$\frac{P_{Initial}(V_{Initial})}{T_{Initial}} = \frac{P_{Operating}(V_{Operating})}{T_{Operating}}.$$

As discussed further below, by monitoring the temperature of the tank 14 and the vapor pressures in the primary and secondary airspaces 42 and 44 during operation, the operational fuel level $h_{new}$ may be determined. In turn, as also further discussed below, this value may be correlated to a quantity of fuel in the tank 14.

By employing pressure and temperatures sensors 46 and 48 to determine operational fuel level $h_{new}$, a number of advantages may be achieved. For example, the exemplary sensor system mitigates the need for mechanical parts, and, as such, the likelihood of mechanical failure in the sensor system is reduced, thereby improving the durability of the system. By improving the durability of the sensor system, major cost savings may be realized by manufactures in the form of warranty repairs and/or by owners/operators in the form of reduced downtimes and repair costs. Indeed, replacement of a malfunctioning sensor system, in certain instances, may require replacement of the entire fuel tank. Moreover, the exemplary system provides a more accurate reading than traditional systems. Indeed, misreadings due to the orientation of the vehicle (e.g., the vehicle is on a hill) are also mitigated due to the fact that pressures and temperature of a tank are not substantially affected by the orientation of the vehicle. Furthermore, because air is less dense than liquid fuel, air will remain above the surface of the liquid fuel. Accordingly, the shape of the tank will not substantially affect the pressure sensors and temperature sensors. Indeed, the exemplary technique facilities the use of multiple, yet interconnected, tank compartments without the need for multiple sensor units.

Figure 4:
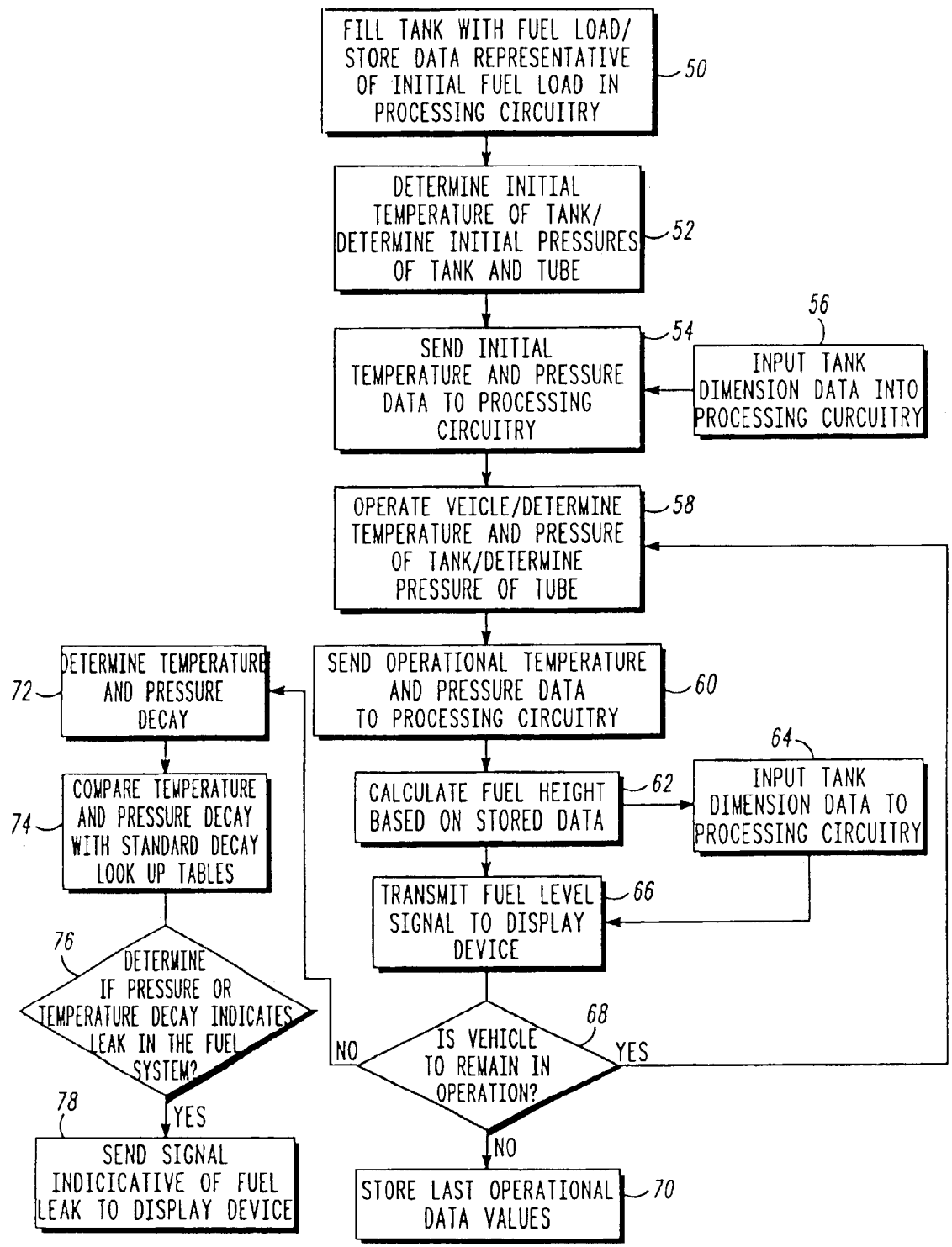
FIG. 4 is a flow chart illustrating stages in an exemplary process for determining fuel status in accordance with aspects of the present technique.

Keeping FIGS. 2 and 3 in mind, FIG. 4 illustrates an exemplary process to determine the operational fuel level $h_{new}$ in the tank 14. During assembly of a vehicle, for example, the tank 14 is empty. That is, no fuel 38 is disposed in the tank 14. However, just prior to leaving the assembly floor, a predetermined amount of fuel 38 may be added to the tank 14. As stated above, this initial fuel fill seals the sensor assembly 46 and submerges the gap 36, thereby isolating the air trapped within the second airspace 44. Advantageously, because the shape of the tank as well as the predetermined amount of fuel added are the same in each of the vehicles produced on the assembly line, the initial fuel level $h_i$ is determinable by simple geometric calculations. In turn, the initial fuel level $h_i$ may be stored in memory of the processing circuitry 24, such as a state machine or a microprocessor-based device. The insertion of fuel 38 into the tank and the storage of the initial fuel level $h_i$ are represented by block 50. Additionally, as represented by block 52, in the exemplary process, the initial temperature ($T_{Initial}$) of the tank 14 and the initial pressure ($P_{Initial}$) within the tank (i.e., the temperature and pressure in the tank just subsequent to the filling of the tank) may be determined by the respective sensor assemblies 46 and 48. As stated above, the initial temperature as well as the initial pressures in both the primary and secondary regions 32 and 34, due to the equilibrium reached, may be the same. These determined values $P_{Initial}$ and $T_{Initial}$ may also be sent to and stored in the processing circuitry 24, as represented by block 54. Additionally, as represented by block 56, the manufacturer, service professional, and/or user may input and store tank dimension data in the processing circuitry 24 in a look-up table, for example. Advantageously, as discussed further below, this tank dimension data may be used to correlate the operational fuel level $h_{new}$ to a quantity of fuel 38 in the tank 14.

During operation of the vehicle, a number of events occur. For instance, fuel 38 is consumed by the engine 12 (see FIG. 1), thereby dropping the fuel level 40 from the initial fuel level $h_i$ to the operational fuel level $h_{new}$. The consumption of fuel 38, in turn, causes the volume of the primary and secondary airspaces 42 and 44 to change. Moreover, operation of the vehicle may cause the temperature of the tank 14 and the fuel 38 disposed therein to increase. However, because of the transfer properties of heat (i.e., conduction, convection, and radiation), the temperatures of the primary region 32 and the secondary region 34 will generally be the same. Keeping the Ideal Gas Law in mind, the pressure of the trapped air in the secondary airspace 44 changes proportionally to the increase or decrease in the volume of the airspace 44. Accordingly, by measuring the operating vapor pressure in the secondary airspace 44 ($P_{Operating2}$) via the sensor assembly 46 and the temperature of the tank 14 via the sensor assembly 46 and/or 48, the change in volume of the secondary airspace 44 may be determined.

Additionally, as stated above, fuel consumption causes the volume of the primary airspace 42 to change as well. Accordingly, the vapor pressure within the primary airspace 42 is also dynamic. In the exemplary embodiment, the primary airspace 42, in contrast to the secondary airspace 44, may not necessarily be sealed from the external atmosphere. That is, both fuel vapor and atmosphere may ingress and egress from the primary airspace 42. To compensate for the ingress and egress of air with respect to the primary airspace 42, manometric principles may be applied. The closed nature of the secondary airspace 44 and the partitioning tube 30 create, in essence, a "U-tube" manometer in the fuel tank 14. Those of ordinary skill in the pertinent art appreciate manometers, as well as the operations and workings thereof. Simply put, manometers relate the change in height of a liquid of a know density, for example the density of a liquid fuel ($\rho_{fuel}$), on opposite sides of the "U-tube" to the difference in vapor pressure on opposite sides of the "U-tube"). Indeed, by measuring the operating pressure in the primary airspace ($P_{Operating1}$) via the sensor assembly 44, the operational fuel level $h_{new}$ may be determined, as discussed further below. The measuring of the operating temperature of the tank ($T_{Operating}$), the vapor pressure in the primary airspace 42 during operation ($P_{Operating1}$), and the vapor pressure in the secondary airspace 44 during operation ($P_{Operating2}$) are represented by block 58 in the exemplary process.

Once the operating conditions discussed above are determined, the data representative of these conditions may be transmitted to the processing circuitry 24, as represented by block 60. The processing circuitry 24 may then calculate the operational fuel level $h_{new}$, as represented by block 62. By way of example, the processing circuitry 24 may employ software that receives the operating condition data (i.e., $T_{Operating}$, $P_{Operating1}$, and $P_{Operating2}$) as well as the data indicative of the initial conditions (i.e., $T_{Initial}$, $P_{initial}$, and $h_i$) to determine the operational fuel level $h_{new}$. Again, by way of example, the software may employ the following formula, wherein g represents the acceleration to due gravity $$\left(9.8\ \frac{m}{\sec^2}\right):$$

$$h_{new} = h_{max} - \left(\frac{(h_{max} - h_i)(T_{Operating})(P_{Initial})}{(T_{Initial})(P_{Operating2})}\right) - \left(\frac{(P_{Operating1} - P_{Operating2})}{(\rho_{fuel})(g)}\right)$$

Indeed, the foregoing formula employs the Ideal Gas Law in conjunction with manometric principals to determine the operational fuel level $h_{new}$ in the tank 14. Accuracy could be improved through the use of compressibility factors for air, fuel vapor and water vapor, if desired.

The operational fuel level $h_{new}$ may then be employed to determine the quantity of fuel 34 in the tank 14. For example, the processing circuitry 24 may, within a memory component, include a stored look-up table that correlates the operational fuel level $h_{new}$ to a quantity of fuel in the tank 14. As stated above in relation to block 56, the manufacturer, service professional, and/or operator may input the look-up table into the processing circuitry 24. The processing circuitry 24 may then send the correlated quantity value to the display unit 26, thereby indicating to the operator the quantity of fuel in the tank 14. This step is illustrated by block 66. However, if so desired, this data need not be correlated and the operational fuel level $h_{new}$ may be transmitted to the display device 26 directly. If the vehicle is to remain in operation, as represented by block 68, then the process may be cycled back to step 58, by which the appropriate temperatures and pressures in the tank 14 are repeatedly monitored. However, if the vehicle is shut down, the last operational data values may be stored in the processing circuitry 24 for quick retrieval during start-up, as represented by block 70. In other words, the $h_{new}$ value may be stored in the memory of the processing circuitry 24.

Those of ordinary skill in the pertinent art appreciate that the foregoing process accounts for the addition of fuel 38 to the tank 14 subsequent to the initial fill, i.e., refueling. So long as the integrity of the secondary airspace 44 is maintained, the insertion of fuel may be compensated for by the exemplary embodiment. The additional fuel will cause the fuel level 40 to rise, however, this will also cause the pressures in the secondary airspace 44 to increase proportionally. As can be seen by the above formula, by accounting for the change in vapor pressures in the tank, particularly in the secondary airspace 44, the operational fuel level $h_{new}$ in the tank 14 may be determined. However, if the integrity of the secondary airspace 44 is compromised, for example, by the fuel level dropping below the height of the gap or by a breach in the tank 14 or sensor assemblies 44 and 48, the system may be reset simply by refueling the tank 14 and measuring and inputting the initial condition values.

Advantageously, the exemplary fuel sensor may also be employed to determine if a fuel leak is present in the system. During quiescent conditions (i.e., a shutdown condition), the temperature and pressure begin to decay, i.e., return to ambient levels. Because the air in the secondary airspace 44 is isolated, the decrease and change in the temperature and pressure are predictable, that is the pressure and temperature decay at known rates. Accordingly, as represented by block 72, the appropriate sensor assemblies 46 and 48 may measure the temperature and pressure decay rates in the tank 14. The measured decay rates may then be transmitted to the processing circuitry 24, which, in turn, compares the decay rates to standard decay rates stored in a look-up table in the memory of the processing circuitry 24. This act is represented by block 74 in the exemplary process. If the processing circuitry 24 determines that the decay rates indicate a leak in the fuel system, as represented by block 76, the processing circuitry 24 may send a signal to the display device 26 indicative of a leak, as represented by block 78. In turn, the display device 26 may indicate to the user that a fuel malfunction or leak may have occurred, and, as such, should be further investigated.

While the invention may be susceptible to various modifications and alternative forms, specific embodiments have been shown by way of example in the drawings and have been described in detail herein. However, it should be understood that the invention is not intended to be limited to the particular forms disclosed. For example, as stated above, the present invention may be employed in any number of modalities such as airplanes, marine craft or generator sets. Indeed, the present technique may be applied to any number of applications where the determination of a level of liquid in a container is a concern. The invention is to cover all modifications, equivalents, and alternatives falling within the spirit and scope of the invention as defined by the following appended claims.

What is claimed is:

1. A sensing device for use with a liquid storage tank having primary and secondary areas, comprising:
   a first sensing component configured to determine a vapor pressure of the primary area; and
   a second sensing component configured to determine a vapor pressure of the secondary area upon isolation of the primary area from the secondary area at a predetermined liquid level in the liquid storage tank; and
   a third sensing component configured to determine a temperature in the liquid storage tank, wherein a level of liquid in the tank is determined via the formula:

$$h_{new} = h_{max} - \left(\frac{(h_{max} - h_i)(T_{Operating})(P_{Initial})}{(T_{Initial})(P_{Operating2})}\right) - \left(\frac{(P_{Operating1} - P_{Operating2})}{(\rho_{fuel})(g)}\right).$$

2. The sensing device as recited in claim 1, comprising a fourth sensing component configured to determine a temperature of the primary area, and wherein the third sensing component is configured to determine a temperature of the secondary area.

3. The sensing device as recited in claim 1, wherein the first and second sensing components comprise evaporative-pressure sensors couplable to the liquid storage tank.

4. The sensing device as recited in claim 1, wherein at least one of the first and second sensing components comprises a temperature and evaporative-pressure sensor couplable to the liquid storage tank.

5. The sensing device as recited in claim 1, wherein the first, second and third sensing components are operable in a liquid fuel tank having a liquid fuel disposed therein.

6. A liquid storage tank, comprising:
   a housing having primary and secondary areas configured to be isolated from each other upon insertion of a predetermined amount of liquid in the housing;
   a first sensing component located in the primary area and the configured to determine vapor pressure;
   a second sensing component located in the secondary area and configured to determine vapor pressure; and
   a third sensing component located in the housing and configured to determine temperature, wherein a level of liquid in the tank is determined via the formula:

$$h_{new} = h_{max} - \left(\frac{(h_{max} - h_i)(T_{Operating})(P_{Initial})}{(T_{Initial})(P_{Operating2})}\right) - \left(\frac{(P_{Operating1} - P_{Operating2})}{(\rho_{fuel})(g)}\right).$$

7. The liquid storage tank as recited in claim 6, wherein the housing is configured to store liquid fuel.

8. The liquid storage tank as recited in claim 6, wherein the housing is configured to reside in a vehicle.

9. The liquid storage tank as recited in claim 6, wherein the housing comprises plastic.

10. The liquid storage tank as recited in claim 9, wherein the housing comprises blow-molded plastic.

11. A vehicular system, comprising:
    a vehicle;
    a fuel tank disposed in the vehicle, the fuel tank having primary and secondary areas configured to isolate from each other upon insertion of a predetermined amount of fuel in the fuel tank;
    first and second sensing components configured to determine vapor pressure and located in the primary and secondary areas, respectively; and
    a third sensing component located in the fuel tank and configured to determine temperature, wherein a level of liquid in the tank is determined via the formula:

$$h_{new} = h_{max} - \left(\frac{(h_{max} - h_i)(T_{Operating})(P_{Initial})}{(T_{Initial})(P_{Operating2})}\right) - \left(\frac{(P_{Operating1} - P_{Operating2})}{(\rho_{fuel})(g)}\right).$$

12. The vehicle system as recited in claim 11, wherein at least one of the first, second and third sensing components is configured to communicate with processing circuitry.

13. The vehicle system as recited in claim 11, comprising an indicator configured to indicate a quantity of fuel in the fuel tank, wherein the indicator is configured to communicate with the processing circuitry.

14. The vehicle system as recited in claim 11, wherein the vehicle is an automobile.

15. The vehicle system as recited in claim 11, wherein at least one of the first and a second sensing components comprises a temperature and evaporation-pressure sensor.

16. The vehicle system as recited in claim 11, comprising a fourth sensing component located in the primary area and configured to determine temperature, and wherein the third sensing component is located in the secondary area.

17. The vehicle system as recited in claim 11, wherein the fuel tank comprises a plastic material.

18. The vehicle system as recited in claim 17, wherein the fuel tank comprises a blow-moldable plastic.

19. A liquid level sensing system for use in a tank having primary and secondary areas configured to isolate from each other upon insertion of a predetermined amount of liquid in the tank, comprising:
    a first sensing component located in the primary area and configured to determine vapor pressure;
    a second sensing component located in the secondary area and configured to determine vapor pressure;
    a third sensing component located in the tank and configured to determine temperature; and
    processing circuitry configured to communicate with the first, second, and third sensing components, wherein the processing circuitry is configured to determine a level of liquid in the tank via the formula:

$$h_{new} = h_{max} - \left(\frac{(h_{max} - h_i)(T_{Operating})(P_{Initial})}{(T_{Initial})(P_{Operating2})}\right) - \left(\frac{(P_{Operating1} - P_{Operating2})}{(\rho_{fuel})(g)}\right).$$

20. The liquid level sensing system as recited in claim 19, wherein at least one of the first and second sensing components comprises a temperature and evaporative-pressure sensor.

21. The liquid level sensing system as recited in claim 19, wherein the first, second, and third sensing components are operable in a liquid fuel environment.

22. The liquid level sensing system as recited in claim 19, comprising an indicator electrically coupled to the data processing circuitry and configured to indicate a quantity of fuel in the tank visually.

23. A method of determining a level of liquid in a storage tank having primary and secondary areas configured to isolate from each other upon insertion of a predetermined amount of liquid in the tank, comprising the acts of:

determining vapor pressures in each of the primary and secondary areas upon isolation thereof;

determining a temperature of at least one of the primary and secondary areas; and calculating a level of liquid in the tank via the determined vapor pressures and temperature via the formula:

$$h_{new} = h_{max} - \left( \frac{(h_{max} - h_i)(T_{Operating})(P_{Initial})}{(T_{Initial})(P_{Operating2})} \right) - \left( \frac{(P_{Operating1} - P_{Operating2})}{(\rho_{fuel})(g)} \right).$$

24. The method as recited in claim 23, comprising the act of correlating the level of liquid to a quantity of liquid in tank.

25. The method as recited in claim 24, wherein the act of correlating includes correlating via a look-up-table.

26. The method as recited in claim 24, comprising displaying the quantity of fuel in the tank visually via an indicator.

27. A computer program for use with a liquid storage tank having primary and secondary areas configured to isolate from each other upon insertion of a predetermined amount of liquid in the tank, the computer program being disposed on one or more tangible media, comprising:

code for calculating a level of liquid in the tank via input values representative of the vapor pressure in each of the primary and secondary areas and of the temperature in at least one of the primary and secondary areas, wherein the code for calculating determines the level of liquid in the tank via the formula:

$$h_{new} = h_{max} - \left( \frac{(h_{max} - h_i)(T_{Operating})(P_{Initial})}{(T_{Initial})(P_{Operating2})} \right) - \left( \frac{(P_{Operating1} - P_{Operating2})}{(\rho_{fuel})(g)} \right); \text{ and}$$

code for correlating the level of liquid in the tank to a quantity of fuel in the tank.

28. The computer program as recited in claim 27, wherein the code for correlating includes a look-up-table.

29. The computer program as recited in claim 27, comprising a code for comparing decay rates of the vapor pressure and temperature in the tank subsequent to operation with a predetermined vapor pressure and temperature decay rates to determine integrity of a fuel system.

\* \* \* \* \*